POST-DETECTION DIVERSITY COMBINING SYSTEM

Filed Oct. 16, 1958 3 Sheets-Sheet 1

INVENTORS.
ROBERT T. ADAMS
BARRY M. MINDES
ZENO G. LYON
BY
Alfred C. Hill
AGENT

POST-DETECTION DIVERSITY COMBINING SYSTEM

Filed Oct. 16, 1958 3 Sheets-Sheet 2

INVENTORS.
ROBERT T. ADAMS
BARRY M. MINDES
ZENO G. LYON

BY Alfred C. Hill
AGENT

POST-DETECTION DIVERSITY COMBINING SYSTEM

Filed Oct. 16, 1958 3 Sheets-Sheet 3

INVENTORS.
ROBERT T. ADAMS
BARRY M. MINDES
ZENO G. LYON
BY Alfred C. Hill
AGENT 3,013,151
POST-DETECTION DIVERSITY COMBINING SYSTEM Robert T. Adams, Short Hills, N.J., Barry M. Mindes, New York, N.Y., and Zeno G. Lyon, Plainfield, N.J., assignors to International Telephone and Telegraph Corporation, Nutley, N.J., a corporation of Maryland Filed Oct. 16, 1958, Ser. No. 767,547
17 Claims. (Cl. 250—20)

This invention relates to diversity receiving systems and more particularly to a post-detection diversity combining system for use in angularly modulated, such as frequency (FM) or phase (PM) modulated, diversity communication systems.

In communication systems which experience signal fading, such as, but not restricted to, beyond-the-horizon or scatter communication systems, diversity reception can be employed to reduce the effects of signal fading. Diversity reception reequires that a plurality of signal paths be provided so that the signals following these paths are uncorrelated as to fading. The plurality of uncorrelated signals can be provided by employing spaced antennas, spaced frequencies or receiving signals at spaced times. Independent of the means by which the separate uncorrelated signals are obtained, there is required an arrangement to capitalize on the resultant diversity advantage. In a general sense the arrangement to capitalize on the diversity advantage may be divided into two categories, (1) switching diversity or (2) combining diversity. In switching diversity, the quality of the signals from each receiving ssytem are compared and the best one selected while the other signals are rejected. In combining diversity, all the signals received in a diversity system are combined by addition (mixing) in controlled proportions to provide a better output signal-to-noise ratio than that of any single receiver. This improvement is possible because the noise components are random in character and add in RMS (root mean square) fashion while the signals add linearly. The combining diversity arrangement has a further advantage that no switching transients which occur in switching diversity arrangements are introduced.

The diversity system described in the present application is directed toward a type of diversity combining arrangement and with more particularity to a diversity combining arrangement wherein the diversity signals are combined following the detection of the audio signals present on the received radio frequency signals. In the prior art arrangement of post-detection diversity combining, the usual criterion for quality in a modulated received signal is the signal-to-noise ratio after demodulation. In a frequency modulation system operating above threshold, the signal level in the intelligence bandwidth is a function of the deviation and is invariant with the radio frequency signal level. The comparison of the signal-to-noise ratio between receivers is therefore a function of the noise power alone. For this reason, the criterion for quality of received signal is the noise power present in the baseband or intelligence band. In these prior art diversity systems, the modulating signals are rejected by a high-pass filter and the remaining noise spectrum above the intelligence band is integrated and measured. In FM receivers of this type of prior art arrangement, the baseband or intelligence signal has very nearly the same constant level at the output of each receiver due to the action of the limited stages but the noise level varies inversely with the radio frequency (RF) signal level. Hence as the RF signal amplitude decreases, the noise level increases. Since the signal output is unaffected by the signal combination and since the RMS noise voltages in the various receiver outputs rise and fall with radio frequency signal levels being received, it is reasonable to expect that it is the resultant noise component of the output signal that is operated upon by the prior art to minimize this noise signal by varying the receiver output impedances. One way of accomplishing the above is to apply the baseband intelligence to the grid of a cathode follower whose bias is controlled by the integrated out-of-band noise. As the noise level rises in the baseband, the output of out-of-band noise will cause a gradual biasing off of the cathode follower with respect to other cathode followers with an attendant rise in the output impedance of this cathode follower with respect to the others as seen from the load, thereby reducing the noise level at the output of the receiver. The outputs of each channel are connected in parallel to a common load to obtain the desired diversity advantage in this type of signal combining diversity system.

Therefore, an object of this invention is the provision of a post-detection diversity combining system which requires less equipment than the prior art post-detection diversity combining system.

Another object of this invention is the provision of a post-detection diversity combining system eliminataing the necessity of employing a noise detector and amplifier operable to adjust the output impedance of the receiver.

In the copending application of F. J. Altman and A. T. Brown, III, Serial No. 719,181, filed February 27, 1958, entitled "Radio Diversity Receiving System," now abandoned, there is described a predetection equal gain combining linear adding combiner operable at IF frequencies wherein an AGC cross-connection maintains equal gain on a group of receivers. There is further required in this predetection equal gain combining arrangement a control circuit to control the signal phase so that additive rather than canceling phase of the signals to be combined is maintained.

Up until this time equal gain combining techniques have not been applied to post-detection combiners for frequency modulation rceivers because the limiter action of the usual signal limiters destroys the original amplitude ratio of the received signals which results in a large increase in noise when the signal input to a receiver is small or absent.

Therefore, still another object of this invention is to apply equal gain combining techniques to a post-detection diversity combining system.

A feature of this invention is the provision of a means to provide equal gain in each of a plurality of angularly modulated receivers from the input to a point following the angular modulation detectors to provide an equal gain combining post-detection diversity combining system.

Another feature of this invention is the provision of a means in each of a plurality of angular modulation receivers to maintain the original relative amplitude of the received signals at the detector outputs and a linear adding arrangement to add together the detected outputs of the plurality of receivers.

Still another feature of this invention is the employment of a particular class of limiters which exhibits a characteristic defect in that the output signal level varies in accordance with the input signal amplitude such that the relative amplitudes of the received signals in a plurality of frequency modulation receivers are preserved or the ratio increased at the detector outputs to enable the linear addition of the detected outputs to achieve diversity advantage.

The particular class of limiters which exhibits the characteristic defect of the output signal level varying in accordance with the input signal level can be termed a linear limiter or an alternating current (A.C.) limiter, since this class of limiters with which this invention is concerned acts to suppress or greatly reduce rapid variations in signal amplitude but do not exhibit a permanent change in gain when the long-term average signal level increases or decreases. The term "linear limiters" or "A.C. limiters" employed hereinafter in both the specification and the claims is directed to this particular class of amplifiers which permits the achievement of the objects and features of this invention, namely, equal gain combining after the detection of the modulating components of a plurality of received radio frequency signals to provide a post-detection diversity combining system which is simplified in nature with respect to the prior art post-detection diversity combining systems. It is to be remembered that the linear limiters may be slightly nonlinear due to components employed therein, but that this non-linearity is such that the relative amplitudes of the received signals are preserved or slightly increased which causes the linear limiters to approach a maximal ratio squaring combining arrangement.

A further feature of this invention is the provision of a linear or A.C. limiter which employs a time constant circuit to provide the desired A.C. limiting action but yet prevents a change in gain in the presence of long-term average signal level changes.

Still a further feature of this invention is the provision of a feedback-type limiter employing a capacitor in the feedback path thereof to enable the A.C. limiting action but prevent long-term changes in gain of the amplifier stage.

Another feature of this invention is the provision of a linear limiter comprising a fixed bias source and a pair of diodes connected in series coupled to each of the receiver channels with each pair of diodes being interconnected such that the arithmetic sum of the signal amplitude on each of the signal paths is equal to the bias voltage of the fixed bias source. This advantage of this linear limiter is that the sum of the peak-to-peak value of the signals at the output of the limiters is equal to the fixed bias voltage connected to the cross-connected linear limiter thereby providing a constant output from the diversity combining arrangement.

Still a further feature of this invention is the incorporation of the post-detection linear adder combiner of the present invention with other known types of diversity combining arrangements of the predetection type to provide an improved N-fold diversity receiving arrangement resulting in increased reliability and a fail-safe system.

The above-mentioned and other features and objects of this invention will become more apparent by reference to the following description taken in conjunction with the accompanying drawings, in which.

Figures 1, 2:
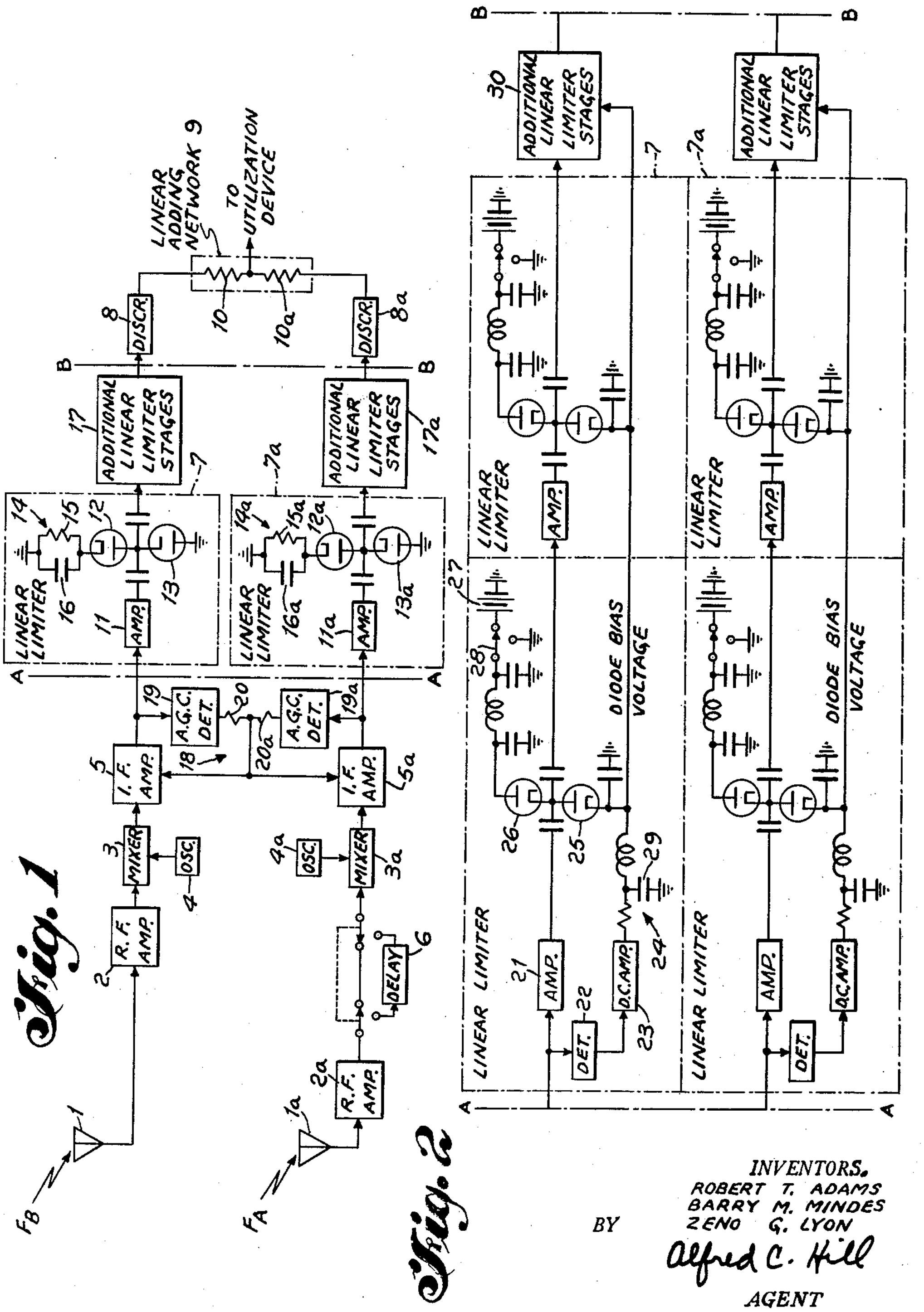
FIG. 1 is a schematic diagram partially in block form of a diversity receiving system employing one form of linear limiter in accordance with the principles of this invention.
FIG. 2 is a schematic diagram partially in block form of another form of linear limiter which may be substituted for that equipment between lines AA and BB of FIG. 1.

Referring to FIG. 1, there is disclosed therein in a schematic diagram, partially in block form, a two-fold diversity receiving system employing one form of the post-detection combining arrangement of this invention. The receiving system of FIG. 1 is for purposes of illustration to teach one how to employ the techniques herein expounded to provide simple post-detection diversity combining arrangements. Each of the receiving channels includes an antenna 1, an RF amplifier 2 and a mixer 3 which in conjunction with oscillator 4 beats the received RF signals down to an IF level, the output of mixers 3 being coupled to IF amplifiers 5. The arrangement depicted in FIG. 1 to the left of line AA can be a frequency diversity, a space diversity, or a time diversity receiving arrangement. In a space diversity receiving arrangement, antennas 1 and 1*a* would be spaced sufficiently to provide two uncorrelated signal paths for a signal having identical carrier frequencies. Hence, $F_A$ and $F_B$ would be equal in frequency and would be picked up by antennas 1 and 1*a* and applied to the remaining components of the circuit. For a frequency diversity arrangement all that is required is that the received signals $F_A$ and $F_B$ be sufficiently spaced to provide a pair of uncorrelated signals. In this instance the radio frequency amplifiers 2 and 2*a* would be tuned to the appropriate frequency of the receiving antennas to make sure that the frequency signals are shunted to their proper receiving channel. The oscillators 4 and 4*a* could be adjusted in frequency to provide identical IF frequencies for coupling to amplifiers 5 and 5*a*. It should be pointed out herein, however, that it is not necessary to provide identical frequencies for application to the linear limiters of this invention. To accomplish time diversity, it is understood that the signals transmitted would be transmitted in spaced time, and hence it would be required at the receiving terminal to provide a delay 6 in one of the receiving channels to cause time coincidence between the received signals on antennas 1 and 1*a* when they are applied to IF amplifiers 5 and 5*a*. The hereinabove discussion of how the front end of the receiving arrangement of FIG. 1 would be arranged to handle frequency, time and space diversity applies to the remaining figures of this application.

The outputs of IF amplifiers 5 and 5*a* are coupled to linear limiters 7 and 7*a* of their respective receiving channels to provide equal gain from their input to a point following the output of the discriminators 8 and 8*a*, respectively. By providing equal gain between the input and output of the pair of receiving channels, it is possible to employ a linear adding circuit 9 which may simply consist of resistors 10 and 10*a*. It is to be understood that network 9 may also be a hybrid-type linear adding arrangement. The linear addition of the detected outputs of discriminators 8 and 8*a* provides a single output signal for utilization having an improved signal-to-noise ratio over the signal-to-noise ratio of an individual receiver.

In the operation of the post-detection combining system of this invention wherein equal gain is provided from the input of the receiving channels to a point following the discriminators 8 and 8*a*, it is required that the following relative amplitude relationships be adhered to to enable the linear addition of a plurality of received signals to achieve diversity advantage.

$$\frac{e_{\text{ant a}}}{e_{\text{ant b}}}=\frac{e_{\text{in a}}}{e_{\text{in b}}}=\frac{e_{\text{out a}}}{e_{\text{out b}}}$$

where $e_{\text{ant a}}$ and $e_{\text{ant b}}$ equals the amplitude of the RF signal at antennas 1 and 1*a*, respectively, $e_{\text{in a}}$ and $e_{\text{in b}}$ equals the amplitude of the IF signal at the output of amplifiers 5 and 5*a*, respectively, and $e_{\text{out a}}$ and $e_{\text{out b}}$ equals the amplitude of the intelligence signal at the output of discriminators 8 and 8*a*, respectively. It can further be shown, since the diversity communication system is a high frequency system, that $N_{\text{ant a}}=N_{\text{ant b}}$, where $N_{\text{ant a}}$ equals the noise on antenna 1 and $N_{ant\ b}$ equals the noise on antenna *1a*, and therefore, $$\frac{e_{ant\ a}}{e_{ant\ b}}=\frac{(S/N)_a}{(S/N)_b}$$

where $(S/N)_a$ is equal to the signal-to-noise ratio at antenna *a* and $(S/N)_b$ is equal to the signal-to-noise ratio at antenna *b*. Thus, it can be seen that in the combining arrangement of this invention the relative amplitude of the IF signals are maintained equal to the relative amplitude of the RF frequency signals and that the relative amplitudes of the audio outputs of discriminators 8 and 8*a* are maintained equal to the relative amplitude of RF signals. This enables the desired linear addition of the signal-to-noise ratios of the two received signals. The optimum diversity combining is described by the following formula $$(1)\qquad K=\frac{(e_{ant\ a})(S/N)_a+(e_{ant\ b})(S/N)_b}{(S/N)_a^2+(S/N)_b^2}$$

which is the type of addition present in the embodiment illustrated in FIG. 4, that of maximal ratio squaring, and which will be described hereinafter.

Linear limiter 7 illustrated in FIG. 1 includes an amplifier 11, the output of which is coupled to a pair of series connected diodes 12 and 13 as depicted in the drawings with the anode of diode 13 being connected to ground and the cathode of diode 12 being connected to a time constant circuit 14 including resistor 15 and condenser 16. The action of this linear limiter is as follows. When diodes 12 and 13 conduct, a charge is stored on capacitor 16 to establish a diode bias or limiting level. The time constant of time constant circuit 14 does not permit this limit level to fluctuate rapidly, but the capacitor charge and hence the limiting level will adjust ultimately to long-term signal level changes. For instantaneous amplitude fluctuations of the signal applied from IF amplifier 5, the diodes 12 and 13 will act to limit the amplitude level of the output of amplifier 11 for the bias value established at 16, since diodes 12 and 13 will conduct for signals whose peak to peak amplitude exceed this limit level. However, if the signal amplitude coupled to diodes 12 and 13 should change in a long-term manner, that is, a steady increase or a steady decrease for a sufficient period of time, the charge on condenser 16 will change to adjust the limiting or bias level to this new long-term signal level change, and hence there is no permanent change in the gain of the linear limiter. This arrangement thereby provides a limiter whose output signal level varies with the input signal strength and thereby maintains equal gain from the input of the receiver to a point following discriminators 8. With this type of limiter, namely, the linear limiter or A.C. limiter, the noise present in the system is maintained substantially constant or may even decrease slightly which is different than the prior art post-detection diversity combining system wherein the noise in the angular modulation receivers tends to increase. Hence as the signal level decreases, the noise of this arrangement does not increase.

The blocks 17 labeled additional linear limiter stages may include a plurality of limiter stages much as depicted schematically in block 7, or these stages may take on the characteristics of the other types of linear limiters disclosed in FIGS. 2 to 4 described hereinafter. It has been found while a plurality of cascade connected linear limiters as depicted in block 7 do provide a combining action, that if the number of these linear limiters are too great the ratio of the larger signal to the smaller signal at the output of the detectors is decreased. This is due to the fact that a weak signal wlil render the effect of the time constant means in the last few stages negligible making the limiter action on the weak signal poor since the signal amplitude variations become less and less pronounced while the limiter action on a strong signal is good. A solution to this problem would be to have a plurality of paired diodes biased from a common time constant means rather than from individual time constant means.

Although it is not essential, it is preferred, particularly in certain embodiments of this linear limiter diversity combining arrangement, to provide automatic gain control for the IF amplifiers 5 and 5*a*. Thus, we provide an equal gain AGC circuit 18 including AGC detector 19 which detects the signal of the output of the IF amplifiers 5 and 5*a*, respectively, to produce a control signal which is linearly added by resistors 20 and 20*a* to provide a common AGC control signal which is coupled to amplifiers 5 and 5*a* to provide equal gain for the IF amplifiers. With this preferred arrangement the output amplitude of discriminators 8 and 8*a* is established by the AGC system 18 rather than by the linear limiters. By matching the high-pass time constant of the linear limiters to the low-pass time constant of the AGC system, uniform suppression of amplitude variations is achieved, the A.C. limiters operating against rapid variations and the AGC circuit removing slow variations with a smooth transition. It may further be stated that the AGC system 18 prevents limiting where the limiting is not desired; in other words, the AGC system prevents overloading of stages preceding the limiters 7 and 7*a*.

Referring to FIG. 2, there is illustrated still another embodiment of linear limiter 7 and would be substituted between the lines AA and BB of FIG. 1 in place of the linear limiter disclosed therein. The operation of the linear limiter of FIG. 2 meets the requirements of the post-detection combining system set forth with respect to FIG. 1 but operates in slightly a different manner. Linear limiter 7 of FIG. 2 includes an amplifier 21 whose signal input amplitude is detected by detector 22. The output of detector 22 is amplified by D.C. amplifier 23 to provide the desired D.C. bias level for the series connected diodes 25 and 26. The output of D.C. amplifier 23 is coupled to a time constant network 24 to store bias voltage for each stage of linear limiter 7 which includes diodes 25 and 26 connected in series, the junction between the anode of diode 25 and the cathode of diode 26 being coupled to the output of amplifier 21. The anode of diode 26 may be coupled to a source of voltage depicted by battery 27 for the convenience of D.C. amplifier 23. The bias established by battery 27 will offset from zero the desired bias obtained for the bias of the diodes 25 and 26. If this offset bias diode is not desired, the anode of diode 26 may be connected to ground by proper manipulation of switch 28. As in the arrangement of the linear limiters of FIG. 1, the output of D.C. amplifier 23 is stored on condenser 29 of the time constant circuit 24 such that instantaneous A.C. fluctuations of the signal level do not affect the bias of diodes 25 and 26 and hence will be removed by the conduction of diodes 25 and 26 from the output of the linear limiter. However, the charge on condenser 29 and hence the bias applied to diodes 25 and 26 will vary in accordance to long-term changes in the signal level applied to the input of linear limiters 7 to maintain the gain in the linear limiters the same for all values of input signal levels. This action will maintain the original relative amplitude of the received signals at the detector outputs to thereby enable the linear addition of the detected outputs for diversity combining after discriminators 8 and 8*a*. As depicted in FIG. 2, the bias voltage produced in time constant network 24 is coupled to all the stages of linear limiters taking the form of FIG. 2, each of the linear limiters of FIG. 2 operating in the manner described hereinabove. The additional linear limiters if required illustrated by block 30 may take the form of the linear limiter shown schematically in FIG. 2 or may take the form of the linear limiters shown in FIGS. 1, 3 and 4.

Figure 3:
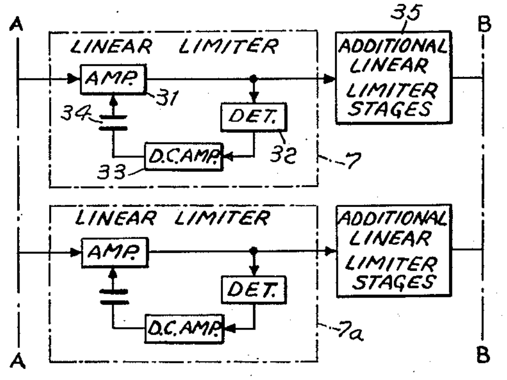
FIG. 3 is a schematic diagram partially in block form of still another linear limiter which may be substituted for the equipment between lines AA and BB of FIG. 1.

Referring to FIG. 3, there is illustrated still another form of linear limiter which may be inserted in the system of FIG. 1 between the lines AA and BB. The linear limiter of FIG. 3 is a feedback-type limiter which includes amplifier 31 and a feedback loop including detector 32 and D.C. amplifier 33 to control the gain of amplifier 31. The output of D.C. amplifier 33 is coupled through condenser 34 to thereby enable the achievement of the desired suppression of instantaneous AM fluctuations by the very fast acting amplifier AGC output of amplifier 33 in the output of limiters 7. No long-term or D.C. change in gain can occur since condenser 34 is placed in the feedback path to control the gain of amplifier 31, and therefore, no long-term change in gain can occur in the linear limiter of FIG. 3. The resultant gain of this feedback-type linear limiter is the normal gain of amplifier 31 without considering the feedback loop. In this linear limiter arrangement it is required that the equal gain AGC circuit 18 be employed in conjunction with the feedback limiter. The output of the feedback linear limiter is coupled to box 35 wherein additional linear limiter stages may be incorporated if so desired. These additional linear limiter stages may take the form of the feedback linear limiter or may take the form of the linear limiters shown in FIGS. 1, 2, and 4.

Figure 4:
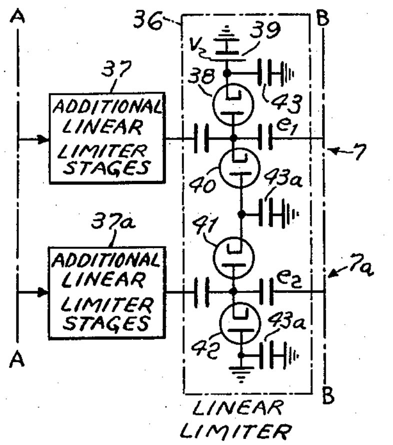
FIG. 4 is a schematic diagram partially in block form of still another form of linear limiter which may be substituted for the equipment between lines AA and BB of FIG. 1.

Referring to FIG. 4, there is still another form of linear limiter illustrated. This can be called a cross-coupled linear limiter and is illustrated in the dotted box 36. That portion of FIG. 4 may be substituted in FIG. 1 between lines AA and BB in place of the linear limiters of the previously described figures. As illustrated in FIG. 4, the cross-coupled linear limiter 36 is the last stage of a plurality of linear limiters depicted by the block 37. It is preferred that the cross-coupled linear limiter 36 be the last linear limiter stage, since the circuit of cross-coupled linear limiter 36 has the characteristic of providing a constant output, and this is desirable in linear addition. The cross-coupled linear limiter includes a fixed bias coupled to cathode of diode 38, such as depicted by battery 39. The anode of diode 38 is coupled in series with the cathode of diode 40, the junction of the cathode and anode of diodes 38 and 40 being coupled to the output of previous linear limiter stages 37 or the input signal source itself. The anode of diode 40 is interconnected in series with the cathode of diode 41 whose anode is coupled to the output of additional linear limiter stages *37a* or the input source of the second receiving channel. The anode of diode 41 is series connected with the cathode of diode 42 whose anode is connected to ground. The condensers 43 provide the desired RF paths for the clipping circuit. The action of cross-coupled linear limiter 36 serves to keep the arithmetic sum of voltages $e_1$ and $e_2$ constant as well as maintain the relative amplitudes of the received signals the same. The peak-to-peak value of $e_1$ plus the peak-to-peak value of $e_2$ is equal to the impressed battery voltage V of battery 39. If $e_1+e_2>V$, heavy conduction takes place which reduces gain and tends to meet the relation $e_1+e_2=V$. If $e_1+e_2<V$, no conduction resulting in maximum gain and hence meets the relation $e_1+e_2=V$. In addition to maintaining a constant voltage at the output of the cross-coupled limiters 36, there is a tendency for this circuit to perform maximal ratio combining rather than equal-gain combining, weak signals being suppressed more than in proportion to their original relative amplitudes. The reason for this is only partially understood. It is apparent that all diodes 40, 41, 42 and 43 must draw equal average current, since only one current path is provided. Accordingly, when unequal signals are applied from the limiter stages 37 and *37a*, the bias is necessarily distributed between diode pairs to satisfy the equal-current condition. If the bias were to divide in the ratio of the applied signal voltages, equal impedances would be presented to the unequal signal channels and unequal currents would be drawn. The division of voltage V across the two diode pairs is therefore in a ratio somewhat greater than the signal ratio such as to draw equal diode currents, and the weaker signal is more heavily loaded and suppressed in a greater proportion than the strong signal. The result approximates ratio squared combining which is an advantage.

Figure 5:
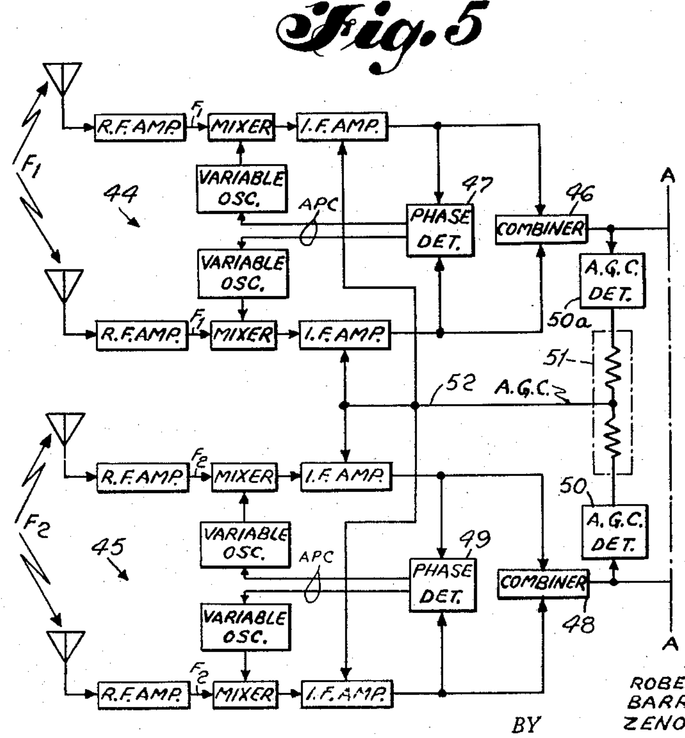
FIG. 5 is a schematic diagram of a four-fold diversity system which may be substituted for the equipment of FIG. 1 to the left of line AA and which may be employed with the post-detection combining arrangements of FIGS. 1 to 4.

As pointed out hereinabove, the various linear limiter circuits may be used for any number of receivers in any combination of space, frequency or time diversity or may be used in combination with other combining methods. Referring to FIG. 5, there is illustrated one form of four-fold diversity arrangement which includes an IF combining equal gain system in conjunction with the linear limiters of this invention. In accordance with FIG. 5, there is provided a pair of two-fold space diversity receiving arrangements identified respectively as space diversity arrangement 44 and space diversity arrangement 45. Space diversity arrangement 44 operates on frequency $F_1$ and space diversity arrangement 45 operates on frequency $F_2$. Frequencies $F_1$ and $F_2$ are spaced to provide frequency diversity signals. Hence, we have two pairs of space diversity signals with each pair of space diversity signals being separated by frequency diversity giving us four-fold diversity arrangement. Each of the space diversity arrangements 44 and 45 employ the techniques described in detail in the above-mentioned copending application to provide equal gain IF combining. As depicted in FIG. 5, the IF signals of space diversity arrangement 44 are combined in a proper phase relationship for linear addition in combiner 44 with the phase relationship of the IF signals being adjusted by means of the phase control loop including phase detector 47. The IF signals of space diversity arrangement 45 are likewise combined in proper phase relationship in combiner 48, the phase relationship of the IF amplifiers being adjusted by the phase control loop including phase detector 49. The equal gain for the IF signals is derived by employing AGC detectors 49 and 50 at the output of the space diversity arrangements 44 and 45 which provides a common AGC control signal by linear addition in the linear adding network 51. The control signal is hence coupled over line 52 to each of the IF amplifiers of the space diversity arrangements 44 and 45. The output of combiners 46 and 48 may then be connected to any one of the simplified post-detection linear adder combining arrangements described in connection with FIGS. 1 to 4, thereby combining the two resulting frequency diversity signals. Most of the threshold improvement and delay distortion advantage of the pre-detection combining of the aforementioned copending application are retained by this approach, but the post-detection linear adder diversity combining system of this invention permits wide tolerances in the two transmitter frequencies providing the frequency diversity signals and their modulation indices. Heretofore, in predetection combining arrangements the transmitter frequencies were required to be held rather accurately and their modulation indices had to be very closely matched.

Figure 6:
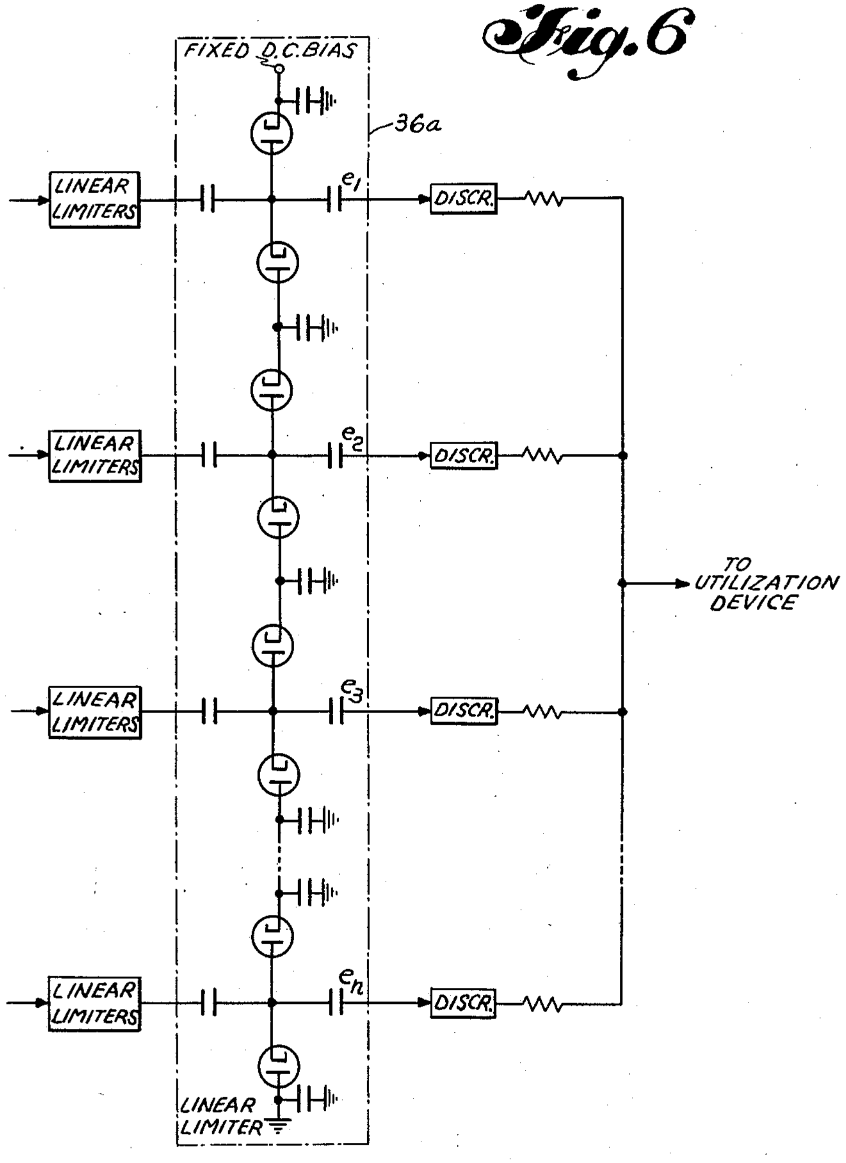
FIG. 6 is a schematic diagram partially in block form of still another form of N-fold diversity arrangements employing the linear limiters of this invention.

Referring to FIG. 6, there is illustrated therein an extension of the linear adder arrangement illustrated and described in connection with FIG. 4. As illustrated in FIG. 6, the cross-coupled linear limiter 36 may be extended to be cross-coupled with any number of diversity signals which it is desired to combine. The same conditions hold true in that $e_1+e_2+e_3+ \ldots +e_n$ is equal to the fixed D.C. bias and thereby provides a constant output from the combining arrangement. The input to the cross-coupled linear limiter *36a* may be derived from a plurality of separate receiving channels or may be the result of prior combining techniques, such as ones illustrated in FIG. 5, or any other known combining techniques on the IF or RF frequency level.

Condenser *43a* in FIG. 4 and its counterpart in FIG. 6 are illustrated as having both plates grounded, in other words, the condensers are shorted out. The purpose of this illustration in the drawings is to demonstrate that the pairs of diodes and their associated condensers are modular units which may be interchanged, or enable the extension of the linear limiter system to operate in conjunction with other signal channels.

While we have described above the principles of our invention in connection with specific apparatus, it is to be clearly understood that this description is made only by way of example and not as a limitation to the scope of our invention as set forth in the objects thereof and in the accompanying claims.

We claim:

1. A post-detection diversity signal combining system comprising a plurality of sources of angularly modulated diversity signals, means coupled to each of said sources to detect the intelligence of said angularly modulated signals, means having a limiting action coupled to each of said sources prior to said detector means to render the ratio of the larger to smaller output signals from each of said detector means at least as large as the ratio of the larger to smaller output signals of said sources, and means coupled to the output of each of said detector means to provide a composite output signal for said system including the output signal of each of said detector means.

2. A post-detection diversity signal combining system comprising a plurality of diversity signal channels, each of said channels including a source of angularly modulated signals, means to detect the intelligence of said angularly modulated signals and means having a limiting action coupled to said channels prior to said detector means to maintain equal gain in said channels from said source to the output of said detector means, and means coupled to the output of each of said detector means to provide a composite output signal for said system including the output signal of each of said detector means.

3. A post-detection diversity signal combining system comprising a plurality of sources of angularly modulated diversity signals, means coupled to each of said sources to detect the intelligence of said angularly modulated signals, means having a limiting action coupled to each of said sources prior to said detector means to maintain equal gain between each of said sources and the output of said detector means coupled thereto, and means to linearly add the output signals of each of said detector means together.

4. A post-detection diversity signal combining system comprising a plurality of sources of angularly modulated diversity signals, means coupled to each of said sources to detect the intelligence of said angularly modulated signals, means having a limiting action coupled to each of said sources prior to said detector means to preserve the relative amplitude of the signals at the output of said sources at the output of said detector means, and means to linearly add the output signals of each of said detector means together.

5. A post-detection diversity signal combining system comprising a plurality of sources of angularly modulated diversity signals, means coupled to each of said sources to detect the intelligence of said angularly modulated signals, means having a limiting action coupled to each of said sources prior to said detector means to render the ratio of the output signals from each of said detector means equal to the ratio of the output signals of said sources, and means to linearly add the output signals of each of said detector means together.

6. A post-detection diversity signal combining system comprising a plurality of diversity signal channels, each of said channels including a source of angularly modulated signals, means to detect the intelligence of said angularly modulated signals and means having a limiting action coupled to said channels prior to said detector means to maintain equal gain in said channels from said source to the output of said detector means, and means to linearly add the output signal of each of said detector means together.

7. A post-detection diversity signal combining system comprising a plurality of sources of angularly modulated diversity signals, a plurality of means to detect the intelligence of said angularly modulated signals, means having a limiting action coupled between each of said sources and each of said detector means to maintain equal gain between said sources and the output of said detector means coupled thereto, and means to linearly add the output signals of each of said detector means together.

8. A post-detection diversity signal combining system comprising a plurality of sources of angularly modulated diversity signals, a plurality of means to detect the intelligence of said angularly modulated signals, means having a limiting action coupled between each of said sources and each of said detector means to preserve the relative amplitude of the signals at the output of said sources at the output of said detector means, and means to linearly add the output signals of each of said detector means together.

9. A post-detection diversity signal combining system comprising a plurality of sources of angularly modulated diversity signals, a plurality of means to detect the intelligence of said angularly modulated signals, means having a limiting action coupled between each of said sources and each of said detector means to render the ratio of the amplitude of the output signals from each of said detector means equal to the ratio of the amplitude of the output signals of said sources, and means to linearly ad the output signals of each of said detector means together.

10. A post-detection diversity signal combining system comprising a plurality of diversity signal channels, each of said channels including a source of angularly modulated signals, means to detect the intelligence of said angularly modulated signals and means coupled between said source and said detector means having a limiting action to maintain equal gain in each of said channels from said source to the output of said detector means, and means to linearly add the output signal of each of said detector means together.

11. A system according to claim 10, wherein said means coupled between said source and said detector means includes at least one circuit having a pair of diodes connected in series, the junction of said diodes being coupled between the output of said source and the input of said detector means and a time constant means responsive to relatively steady signal amplitudes to bias said diodes.

12. A system according to claim 10, wherein said means coupled between said source and said detector means includes at least one circuit having an amplifier and a feedback path, said feedback path including a condenser to prevent the change of gain of said amplifier in the presence of relatively steady signal amplitude changes.

13. A post-detection diversity signal combining system comprising a plurality of diversity signal channels, each of said channels including a source of angularly modulated signals, means to detect the intelligence of said angularly modulated signals, means coupled between said source and said detector means to render the ratio of the larger to smaller output signals from each of said detector means larger than the ratio of the larger to smaller output signals of said sources, and means to combine the output signals of said detector means, said means coupled between said source and said detector including at least one circuit in each of said channels having a pair of diodes connected in series, the junction of said diodes being coupled with respect to alternating current only between the output of said source and the input of said detector means, means interconnecting the pair of diodes of each of said channels to place the pairs of diodes of each of said channels in series and a fixed bias voltage coupled in shunt relation to the series connected pairs of diodes.

14. A post-detection diversity signal combining system comprising a plurality of diversity signal channels, each of said channels including a source of angularly modulated signals, means to detect the intelligence of said angularly modulated signals, means coupled between said source and said detector means to render the ratio of the larger to smaller output signals from each of said detector means larger than the ratio of the larger to smaller output signals of said sources, and means to combine the output signals of said detector means, said means coupled between said source and said detector including a plurality of circuits in each of said channels, at least the last of said circuits including a pair of diodes connected in series, the junction of said diodes being coupled with respect to alternating current only between the output of said source and the input of said detector means, means interconnecting the pair of diodes of each of said channels to place the pairs of diodes of each of said channels in series and a fixed bias voltage coupled in shunt relation to the series connected pairs of diodes.

15. A post-detection diversity signal combining system comprising a plurality of sources of angularly modulated diversity signals, an amplifier coupled to each of said sources, an amplitude detector coupled to the output of each of said amplifiers to produce a control signal, means common to each of said amplitude detectors to linearly add said control signals together to provide a common automatic gain control signal, means to couple said gain control signal to each of said amplifiers to provide equal gain in said amplifiers, a plurality of means to detect the intelligenec of said angularly modulated signals, means having a limiting action coupled between each of said amplifiers and each of said detector means to maintain equal gain between said sources and the output of said detector means coupled thereto, and means to linearly add the output signals of each of said detector means together.

16. A post-detection diversity signal combining system comprising a plurality of sources of angularly modulated diversity signals, an amplifier coupled to each of said sources, an amplitude detector coupled to the output of each of said amplifiers to produce a control signal, means common to each of said amplitude detectors to linearly add said control signals together to provide a common automatic gain control signal, means to couple said gain control signal to each of said amplifiers to provide equal gain in said amplifiers, a plurality of means to detect the intelligence of said angularly modulated signals, means having a limiting action coupled between each of said amplifiers and each of said detector means to preserve the relative amplitude of the signals at the output of said sources at the output of said detector means, and means to linearly add the output signals of each of said detector means together.

17. A four-fold diversity combining system comprising a first pair of receiving channels responsive to a first angularly modulated carrier signal, the antennas of said first pair of channels being spaced to provide space diversity signals at said first frequency, a second pair of receiving channels responsive to a second angularly modulated carrier signal, the antennas of said second pair of channels being spaced to provide space diversity signals at said second frequency, the frequencies of said first and second carrier signals being spaced to provide frequency diversity signals, each of said pairs of channels including a heterodyning means in each channel, an intermediate frequency amplifier coupled to each of said heterodyning means, a phase detector coupled to each of said amplifiers to produce a control signal in accordance with the phase difference between the space diversity signals, means to couple said control signal to said heterodyning means to cause phase coincidence between the space diversity signals and a combined means coupled to the output of said amplifiers to combine the space diversity signals, a detector coupled to the output of each of said combiner means to produce a control signal, adder means coupled to the output of each of said detectors to linearly add said control signals together to produce a common automatic gain control signal, means coupled to said adder means to couple the resultant gain control signal to each of said amplifiers in each of said pair of channels to produce equal gain therein, discriminator means to detect the intelligence of the outputs of each of said combiner means, means having a limiting action coupled between each of said combiner means and each of said discriminator means to preserve the relative amplitude of the signals at the output of said combiner means at the output of said discriminator means and means to linearly add the output signals of each of said discriminator means together.

References Cited in the file of this patent

UNITED STATES PATENTS

| | | |
|---|---|---|
| 2,253,867 | Peterson | Aug. 26, 1941 |
| 2,513,803 | Kahn | July 4, 1950 |
| 2,570,431 | Crosby | Oct. 9, 1951 |
| 2,610,292 | Bond | Sept. 9, 1952 |

FOREIGN PATENTS

| | | |
|---|---|---|
| 135,810 | Australia | Jan. 19, 1950 |

OTHER REFERENCES

Article: Wide-Band FM Adapter by Sulzer, Radio Electronics for April 1950, pages 24, 25.